US009728066B2

(12) United States Patent
Bishop

(10) Patent No.: US 9,728,066 B2
(45) Date of Patent: Aug. 8, 2017

(54) ELECTRIC FENCE MONITOR INCLUDING A GAS DISCHARGE LAMP

(71) Applicant: John C. Bishop, Cookeville, TN (US)

(72) Inventor: John C. Bishop, Cookeville, TN (US)

( * ) Notice: Subject to any disclaimer, the term of this patent is extended or adjusted under 35 U.S.C. 154(b) by 145 days.

(21) Appl. No.: 14/563,751

(22) Filed: Dec. 8, 2014

(65) Prior Publication Data

US 2015/0206414 A1 Jul. 23, 2015

Related U.S. Application Data

(63) Continuation-in-part of application No. 14/099,042, filed on Dec. 6, 2013.

(51) Int. Cl.

| | |
|---|---|
| ***G08B 21/18*** | (2006.01) |
| ***A01K 3/00*** | (2006.01) |
| ***H01J 61/54*** | (2006.01) |
| ***H01J 61/76*** | (2006.01) |
| ***H01J 61/80*** | (2006.01) |

(52) U.S. Cl.

CPC ............ *G08B 21/185* (2013.01); *A01K 3/005* (2013.01); *H01J 61/547* (2013.01); *H01J 61/76* (2013.01); *H01J 61/80* (2013.01)

(58) Field of Classification Search

CPC G08B 21/185; G08B 13/122; G01R 31/3682; G01R 31/3606; A01K 3/005; A01K 2/005

See application file for complete search history.

(56) References Cited

U.S. PATENT DOCUMENTS

| | | | | |
|---|---|---|---|---|
| 3,648,266 | A | 3/1972 | Crist | |
| 4,725,825 | A * | 2/1988 | McKean | G08B 5/36 256/10 |
| 6,265,981 | B1 | 7/2001 | Carson et al. | |
| 2002/0070687 | A1* | 6/2002 | Urakabe | H05B 41/2883 315/291 |
| 2008/0164817 | A1* | 7/2008 | Baarman | H05B 41/295 315/49 |

FOREIGN PATENT DOCUMENTS

| | | | |
|---|---|---|---|
| WO | 2004095894 | A1 | 11/2004 |
| WO | 2009028966 | A1 | 3/2009 |

OTHER PUBLICATIONS

International Searching Authority Search Report and Written Opinion, dated Mar. 23, 2015 re: PCT/US2014/068845, 11 pages.

* cited by examiner

*Primary Examiner* — James Yang

(74) *Attorney, Agent, or Firm* — Waller Lansden Dortch & Davis, LLP; Mark A. Pitchford

(57) ABSTRACT

An electric fence monitor is operable to provide an audible and/or visual indicator of an operating condition (i.e., falter no-fault) of an electric fence and electric fence box. The electric fence monitor is operable to remain continuously connected between the electric fence and earth ground during normal operation of the fence. The electric fence monitor includes a gas discharge lamp light source for providing the visual indicator of the operating condition of the electric fence and electric fence box.

15 Claims, 9 Drawing Sheets

ELECTRIC FENCE MONITOR INCLUDING A GAS DISCHARGE LAMP

CROSS-REFERENCES TO RELATED APPLICATIONS

This application is a continuation in part of U.S. patent application Ser. No. 14/099,042 entitled "ELECTRIC FENCE MONITOR INCLUDING AN AIR GAP" filed on Dec. 6, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electric fence monitors. More particularly, this invention pertains to providing continual audible and visual indicators of an operating condition (i.e., presence or absence of a fault condition) of a segment or length of electric fence.

Electric fences are used by ranchers and farmers to keep animals in a designated area or out of a designated area. Electric fences include a length of conductive material (i.e., the fencing) isolated from earth ground by insulators. The length of conductive material is connected to a fence charger (i.e., electric fence box). Checking and repairing fences is a major part of a farmer or rancher's job often requiring significant time and/or manpower. Faults in the electric fence are caused by animals running through the fence, plants growing up to the electric fence, or plants (e.g., trees) falling on the electric fence. Determining a fault in an electric fence and finding the source of the fault is often time-consuming because the fence must be manually tested to track the source of the fault. In operation, the electric fence charger periodically sends a pulse of static electricity along the electric fence. Parasitic resistances and capacitances bleed much of the energy from the fence between pulses.

When working properly, the electric fence should periodically exhibit over 5000 volts on a tester when energized by the electric fence charger. A user momentarily connects the tester to the electric fence to determine a voltage on the fence. This process is repeated around the fence until the user determines a segment of the fence having the fault condition. Active, self-powered testers are limited by their battery life or to a location with powerline power available. Passive testers are capacitive or resistive based and draw down the voltage on the fence. Therefore, they cannot remain connected to the fence during normal operation (i.e., at all times). There are no passive testers that permanently connect to an electric fence to continually indicate the status (fault or no fault) of a length of electric fence between the tester and the electric fence charger (i.e., electric fence box).

BRIEF SUMMARY OF THE INVENTION

Aspects of the present invention provide an electric fence monitor operable to provide an audible and/or visual indicator of an operating condition (i.e., falter no-fault) of an electric fence and electric fence box.

In one aspect, an electric fence monitor is operable to provide a visual indicator of an operating condition of an electric fence. The electric fences periodically energized by an electric fence charger. The electric fence monitor includes a light source and a wire coil. The light source is configured to provide light in response to receiving power, and the light source includes a gas discharge lamp. The gas discharge lamp includes a substantially transparent tube, a first electrode, and a second electrode. The substantially transparent tube has a first end and a second end opposite the first end. The first electrode is at the first end of the tube. The second electrode is at the second end of the tube, and the second electrode is configured to connect to an earth ground. The wire coil is wound about the tube of the gas discharge lamp from the first electrode toward the second electrode. The wire coil has a first end and a second end. The first end of the wire coil is configured to connect to the electric fence. A length of the electric fence separates the fence charger from the first end of the wire coil.

In another aspect, an electric fence monitor is operable to provide a visual indicator and an audible indicator of an operating condition of the electric fence. The electric fence monitor includes a first contact, a second lead, and a housing, and a light source. The first contact is operable to connect the electric fence. The electric fence is periodically energized by an electric fence charger. A length of the electric fence separates the fence charger from the first contact. The second lead is connected to a second contact. The second contact is separated from the first contact by an air gap. The air gap has a distance less than a critical distance such that an arc forms in the air gap when the electric fence charger energizes the electric fence and there is not a fault on the length of the electric fence separating the fence charger from the first contact. The housing has a first end and a second end opposite the first end. The housing is operable to support the first contact and the second contact. The housing is enclosed at the first end, and opened at the second end such that the electric fence monitor emits an audible knock when the arc forms in the air gap. The light source is operable to provide light in response to receiving power. The light source includes a gas discharge lamp. The gas discharge lamp includes a substantially transparent tube, a first electrode, and a second electrode. The tube has a first end and a second end opposite the first end. The first electrode is at the first end of the tube. The second electrode is at the second end of the tube, and the second electrode is configured to connect to an earth ground. The first electrode is configured to connect to the second lead to receive power from the second lead such that the electric fence monitor emits a flash of light when the arc forms in the air gap and transfers power to the gas discharge lamp.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams. The electrical connection may be direct or indirect (i.e., connected via one or more other elements).

Figure 1:
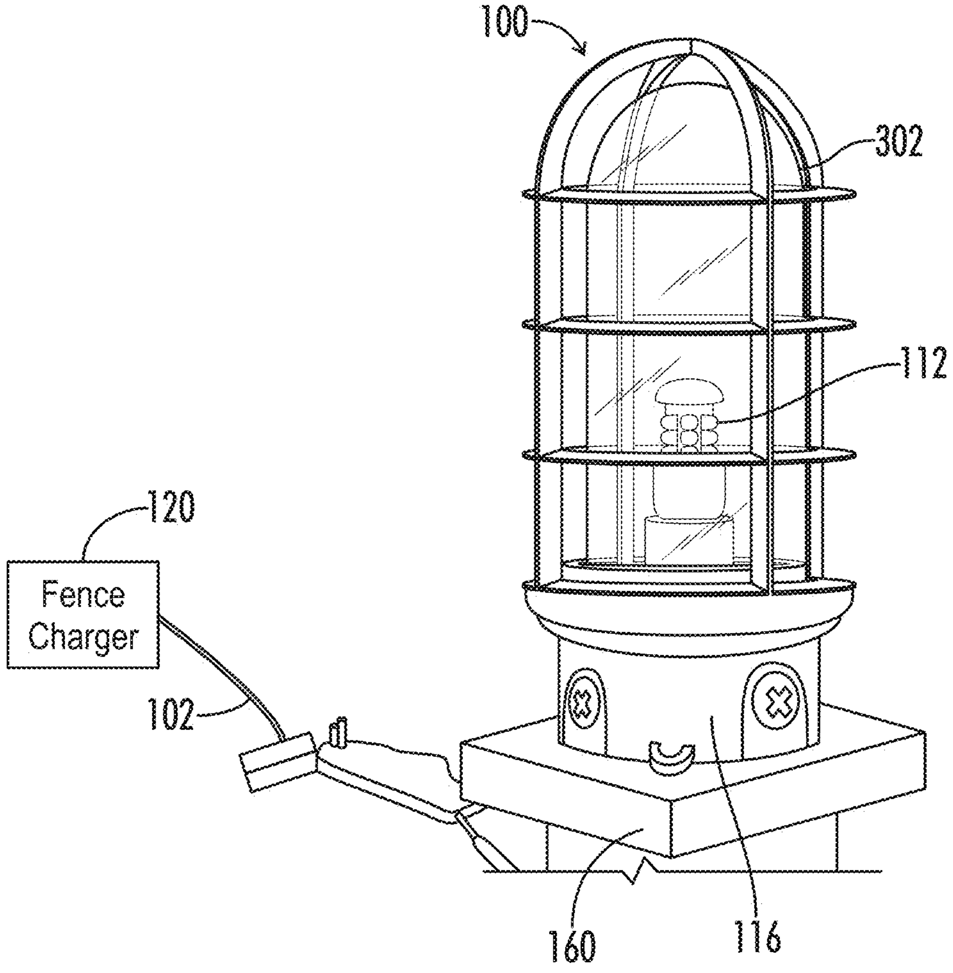
FIG. 1 is a side perspective view of an electric fence monitor operable to emit a visual indicator of an operating condition of an electric fence mounted or secured to a fence post.
Figure 2:
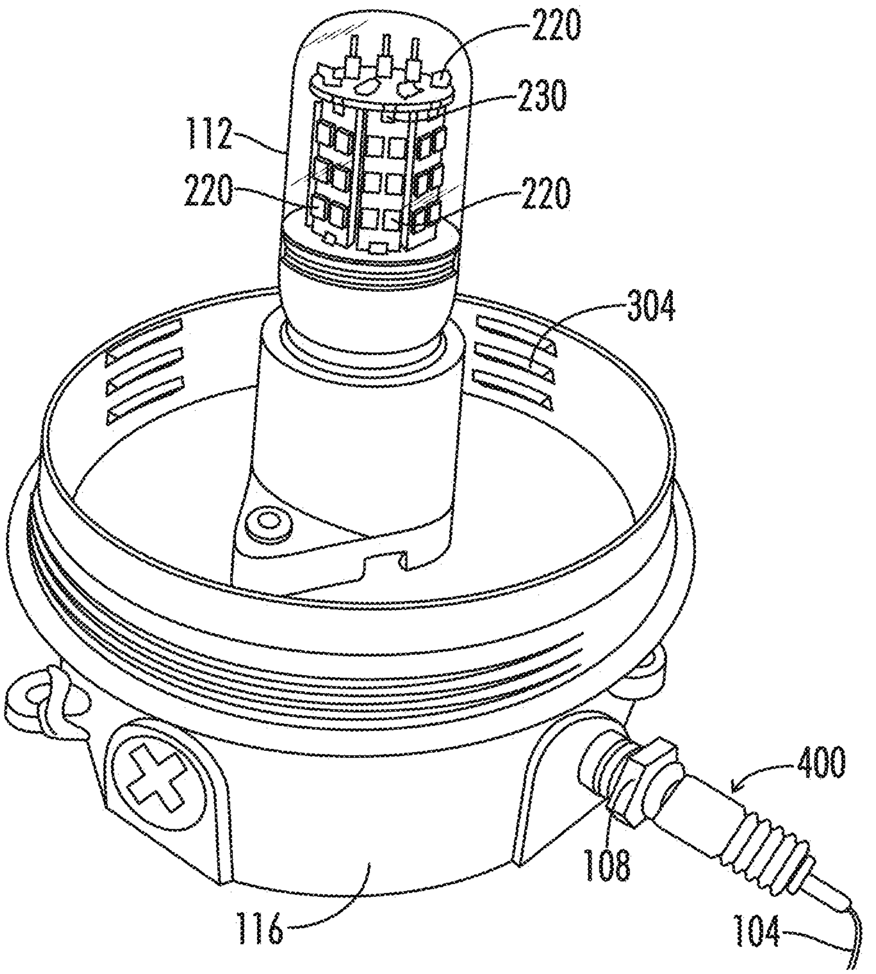
FIG. 2 is an isometric view of an electric fence monitor including internal first and second contacts operable to emit a visual indicator of an operating condition of an electric fence.
Figure 3:
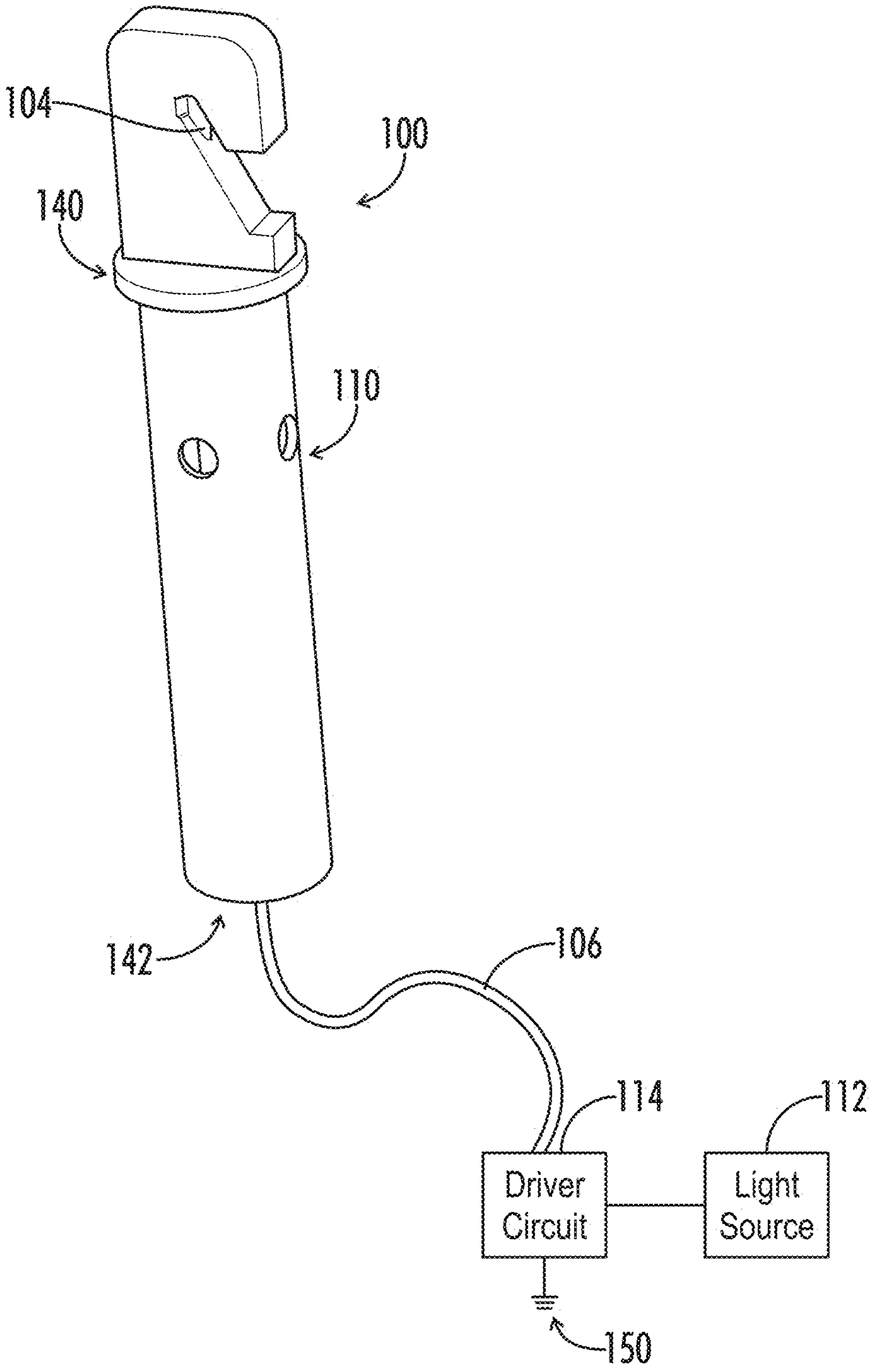
FIG. 3 is an isometric view of an electric fence monitor operable to provide an audible indicator of an operating condition of an electric fence.

Referring to FIGS. 1 and 3, an electric fence monitor 100 is operable to provide a visual indicator and an audible indicator of an operating condition of an electric fence 102. The electric fence monitor 100 includes a first contact 104, a second lead 106 connected to a second contact 108, a housing 110, a light source 112, a driver circuit 114, and a base 116. The first contact 104 is operable to connect to the electric fence 102. The electric fence 102 is periodically energized by an electric fence charger 120. A length of the electric fence 102 separates the fence charger 120 from the first contact 104. The second contact 108 is separated from the first contact 104 by an air gap 130. The air gap 130 has a distance 132 less than a critical distance. The critical distance is the distance at which an arc will no longer formed between the first contact 104 and the second contact 108 when the electric fence charger 120 energized as the electric fence 102. Because the air gap 130 has a distance 132 less than the critical distance, an arc forms in the air gap 130 when the electric fence charger 120 energizes the electric fence 102, as long as there is not a fault on the length of electric fence 102 separating the fence charger 120 from the first contact 104. Examples of faults that could be on the length of electric fence 102 include an open circuit (i.e., a broken fence) and a short-circuit to ground (i.e., an object laying on the fence and the ground or hanging from the fence to the ground).

The housing 110 has a first end 140 and a second end 142. The second end 142 is opposite the first end 140. The housing 110 is operable to support the first contact 104 and the second contact 108. The housing 110 is enclosed at the first end 140 and open at the second end 142 such that the electric fence monitor 100 emits an audible knock when the arc forms in the air gap 130.

The light source 112 is operable to provide light in response to receiving power. In one embodiment, the light source includes a plurality of light emitting diodes (LEDs) 220 and a core 230. Each LED 220 of the plurality of LEDs is configured to receive power from the driver circuit 114. The court 230 is operable to support the plurality of LEDs to 20. The plurality of LEDs 220 are arranged about the core 230 such that when the electric fence monitor 100 is secured to the fence post 160 in an upright orientation (see FIG. 1), the light emitted by the light source 112 is visible from any point above a horizontal plane through the light source 112. As can be seen in FIG. 1, light emitted by the light source 112 is also visible from many points below the horizontal plane through the light source 112. This enables a fence owner to determine the operating condition of the electric fence 102 from a position on the ground, from a mounted position, or from the air (e.g., by helicopter). The brightness of the LEDs 220 and ability to see the light source 112 from above the fence monitor 100 enables the visual indicator to be seen from a great distance. For large ranches that need to check multiple, separate fences powered by separate fence chargers, this enables the rancher to check the entire fence line from a continuous flight in a helicopter, or from a continuous ride in a mounted position (e.g., horseback or all terrain vehicle).

The driver circuit 114 is connected between the second the lead 106 and a ground 150 (e.g., earth ground). The driver circuit 114 is operable to receive electricity passing through the air gap 130 via the second lead 106. The driver circuit 114 provides power to the light source 112 by converting the received electricity such that the electric fence monitor 100 emits a flash of light each time that the arc forms in the air gap 130 and transfers power to the driver circuit 114 from the electric fence 102 (and ultimately from the electric fence charger 120).

The base 116 is operable to support the light source 112 and the driver circuit 114. The base 116 is also operable to secure to a surface such as a fence post 160. In one embodiment, the base 116 has a fitting operable to slip over the top of a steel safety post. In one embodiment, the base has a threaded portion 304. The threaded portion 304 is operable to receive a globe 302.

In one embodiment, the electric fence monitor 100 further includes the globe 302 operable to engage the base 116. The globe 302 may be glass or some other substantially transparent material. The globe 302 cooperates with the base 116 to enclose the light source 112 and driver circuit 114 such that it prevents precipitation from contacting the light source 112 or driver circuit 114. In one embodiment, the globe 302 has approximately 5 threads branch, a thread height of approximately 0.060 inches, a thread top radius of approximately 0.044 inches, a base corner route radius of approximately 0.030 inches, thread sides approximately 30° from vertical, and an inside diameter of approximately 2⅜ inches. The threaded portion 304 of the base 116 is operable to receive a globe 302. It is contemplated that other thread patterns may be used, for example, wide mouth canning jar threads (e.g., approximately 3 inches inside diameter).

In one embodiment, the base 116 is operable to substantially enclose the first contact 104 and the second contact 108. In one embodiment, first contact 104 and the second contact 108 are embodied by a spark plug 400 inserted into the base 116. The electrode of the spark plug 400 acts as the first contact 104, and the threads of the spark plug 400 are part of the second contact 108. In this embodiment, a first lead directly connects the first contact 104 to the electric fence 102, and the electric fence monitor 100 is not capable of producing a substantial audible indicator.

Figure 4:
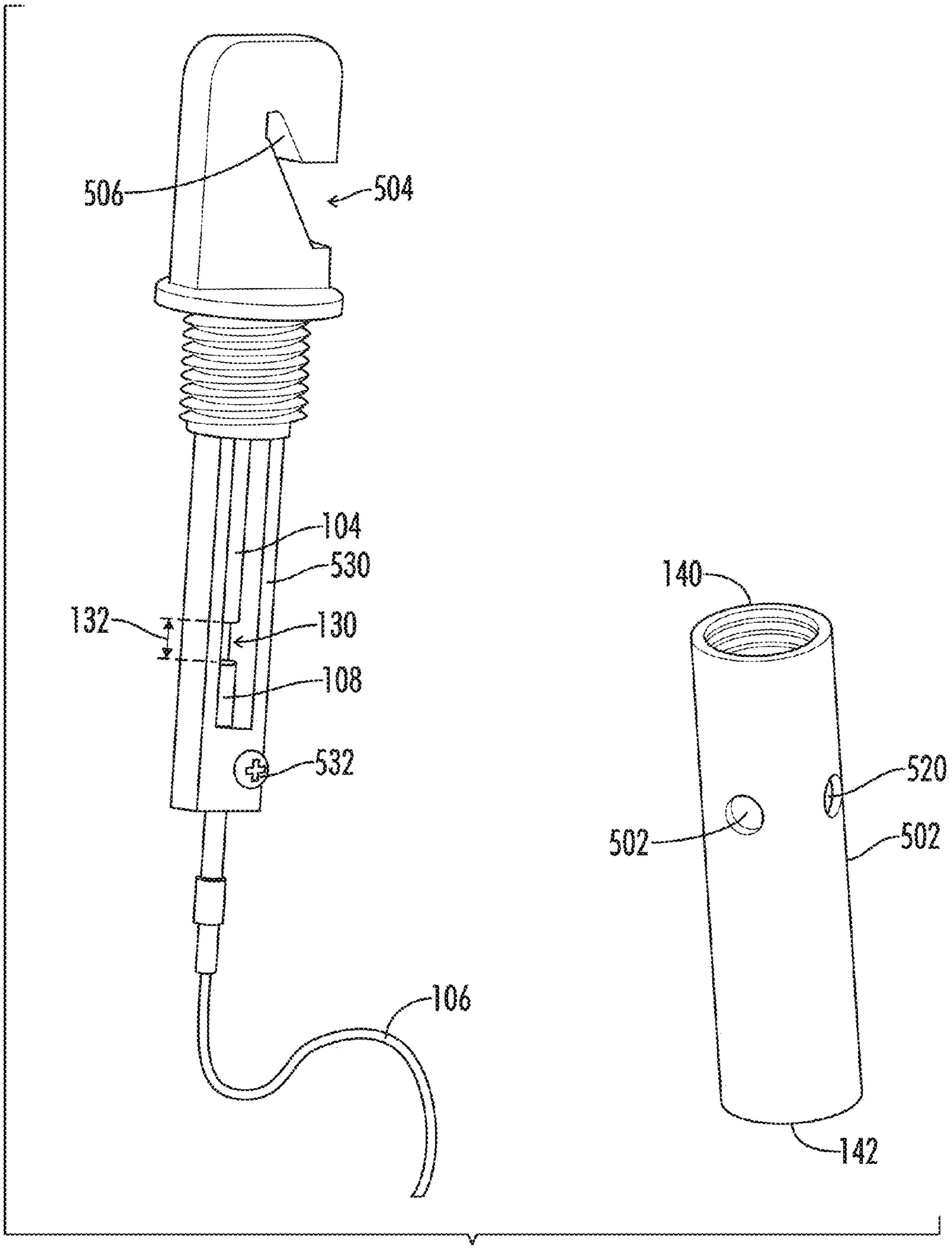
FIG. 4 is a partially exploded isometric view of an electric fence monitor operable to provide an audible indicator of an operating condition of an electric fence of FIG. 3.

Referring to FIGS. 3 and 4, one embodiment of the housing 110 is shown in further detail. The housing 110 and associated structures shown in FIGS. 3-5 used to create an air gap and emit an audible indicator of the condition of the electric fence 102 will hereinafter be referred to as a knocker 650. The housing 110 includes a tubular portion 502 and an end cap 504. The tubular portion 502 is approximately 2 inches long with approximately one half inch inside diameter. The end cap 504 is at the first end 140 of the housing 110. The end cap 504 includes a hook 506 configured to hang the housing 110 on the electric fence 102 with the first contact 104 electrically connected to the electric fence 102 and the first end 140 of the housing 110 above the second end 142 of the housing 110. In one embodiment, the end cap 504 adds approximately one half inch to the length of the tubular portion 5024 and overall length of approximately 2½ inches. In one embodiment, the tubular portion 502 has one or more holes 520 therethrough. The holes 520 in the housing 110 tune the knocking sound of the arc in the air gap 130 and project the knocking sound horizontally from the housing 110. In one embodiment, the length of the tubular portion 502 and the location and size of the holes 520 combined to tune a frequency of the knocking sound of the arc in the air gap 130 to a predetermined frequency. The predetermined frequency is selected to maximize projection of the knocking sound produced by the arc in the air gap 130. Generally, this knock can be heard from a significant distance (e.g., in excess of 100 yards, depending on terrain and background noise).

In one embodiment, the housing 110 further includes a vise 530 and a retainer screw 532. The vise 530 is configured to maintain the first contact 104 and the second contact 108 at the distance of the air gap 130. That is, the vise 530 maintains a predetermined distance between the first contact 104 and the second contact 108 during normal operation. The retainer screw 532 is configured to close the vise 530 on at least one of the first contact 104 and the second contact 108. That is, the retainer screw 532 clamps the vise 530 down on at least one of the contacts to hold them in position during normal operation. Thus, the distance of the air gap 130 is adjustable by unscrewing the end cap 504 from the tubular portion 502 of the housing 110, loosening the retainer screw 532, moving the first and second contacts 104, 108 closer or further apart, tightening the retainer screw 532, and screwing the end cap 504 back onto the tubular portion 502 of the housing 110.

Figure 5:
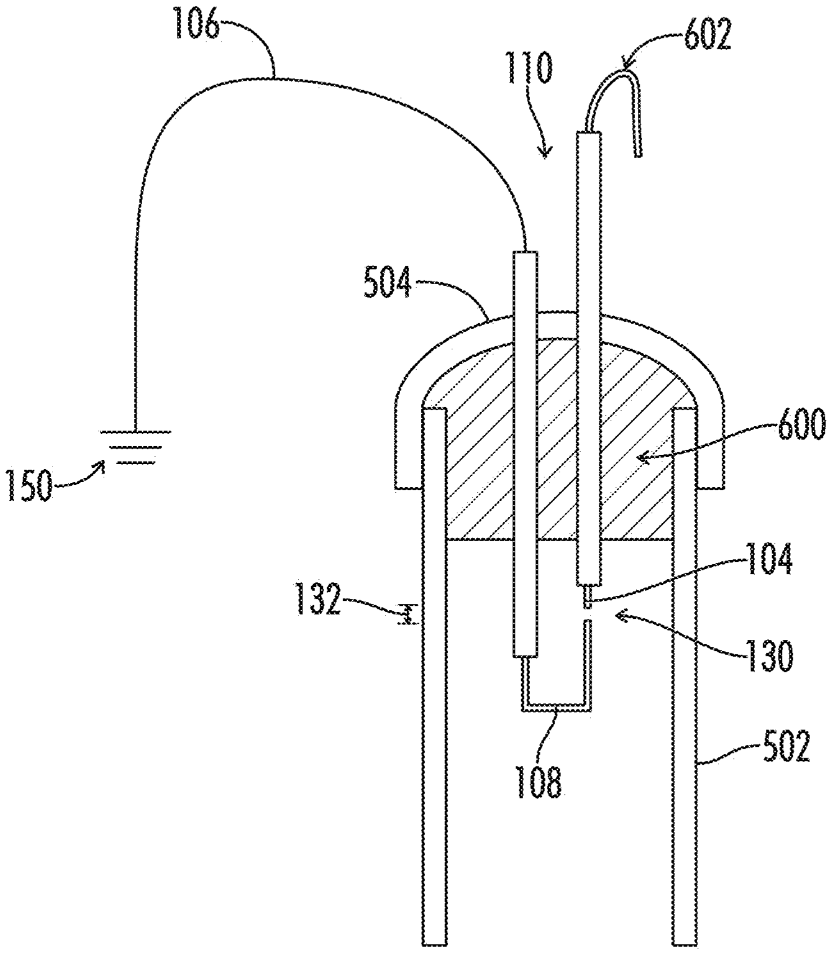
FIG. 5 is a side cutaway view of an electric fence monitor operable to provide an audible indicator of an operating condition of an electric fence.

Referring to FIG. 5, alternative features of the housing 110 are shown. In the embodiment of FIG. 5, at least one of the first lead 602 and the second lead 106 penetrate the end cap 504. The end cap 504 is substantially filled with a hardening compound 600 (e.g., epoxy or silicon). The hardening compound 600 at least partially encapsulates one of the first lead 602 and the second the lead 106. In one embodiment, the first lead 602 forms a hook for engaging the electric fence 102 and hanging the housing 110 from the electric fence 102. In another embodiment, a clamp is connected to the first lead 602, and the clamp is operable to engage the electric fence (i.e., or clip onto the electric fence 102), conduct electricity to the first lead 602, and hang the housing 110 from the electric fence 102 with the first end 140 of the housing 110 above the second end 142 of the housing 110.

Figure 6:
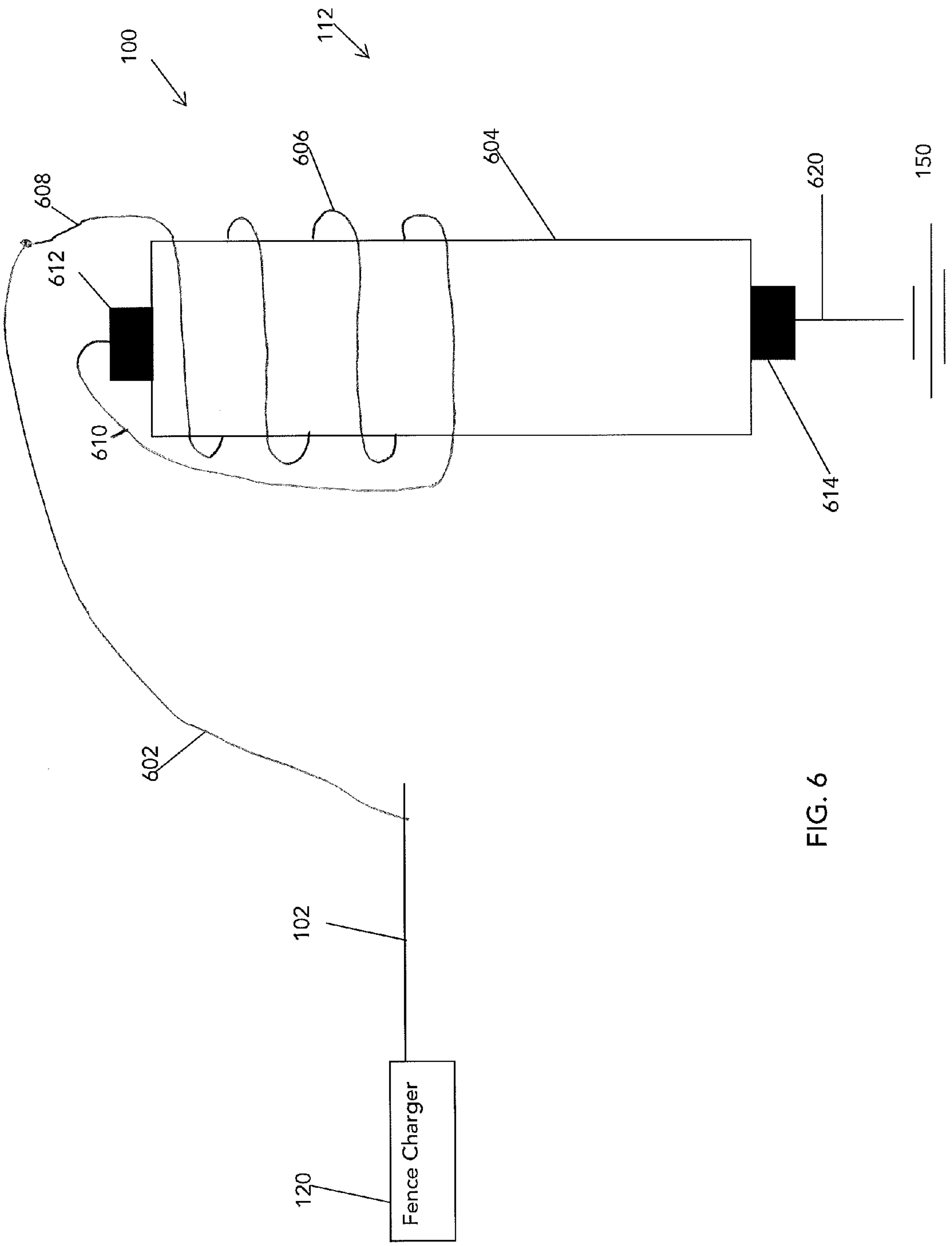
FIG. 6 is a block and partial schematic diagram of an electric fence monitor including a gas discharge lamp and wire coil.
Figure 7:
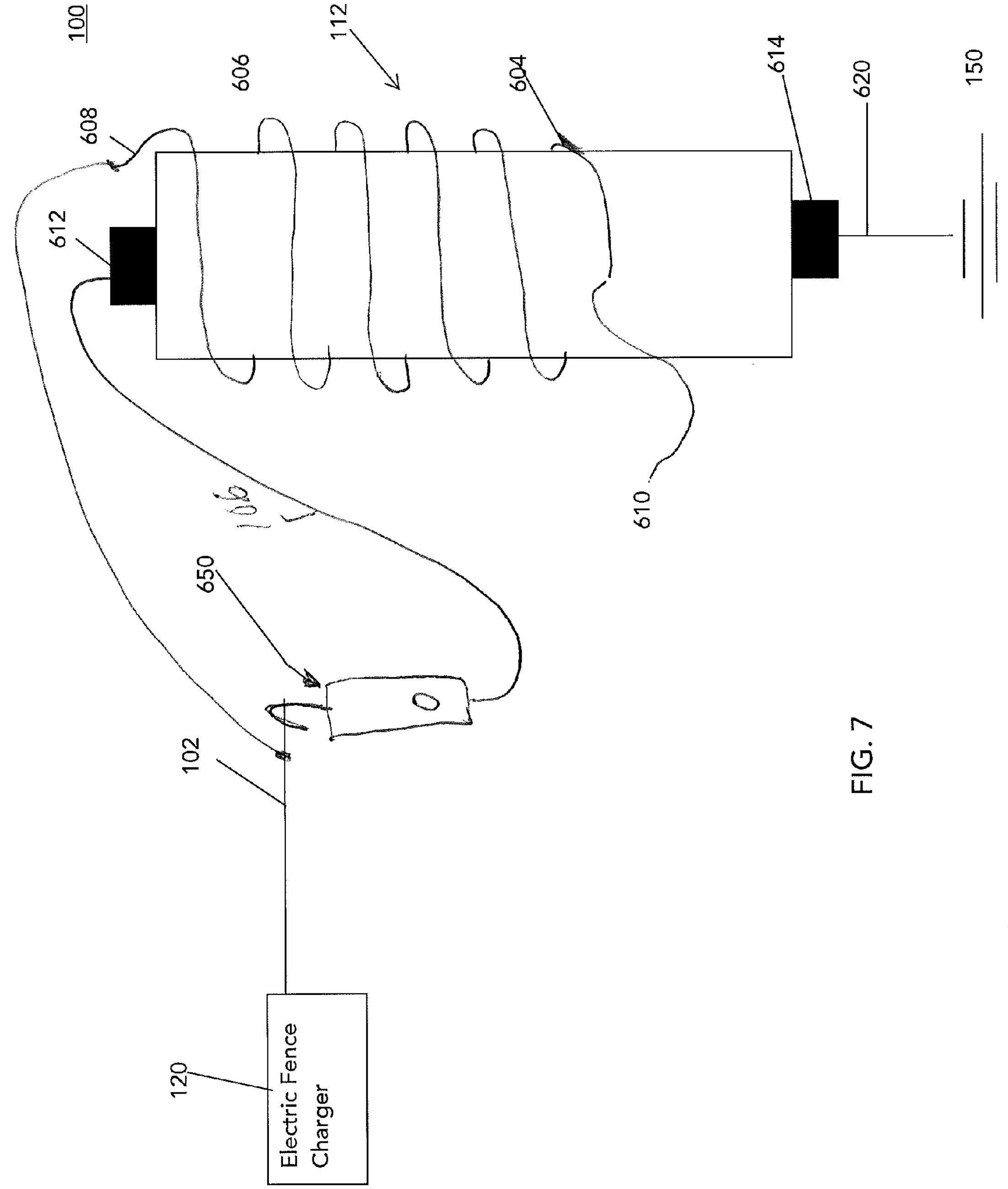
FIG. 7 is a block and partial schematic diagram of an electric fence monitor including a gas discharge lamp, wire coil, and knocker.
Figure 8:
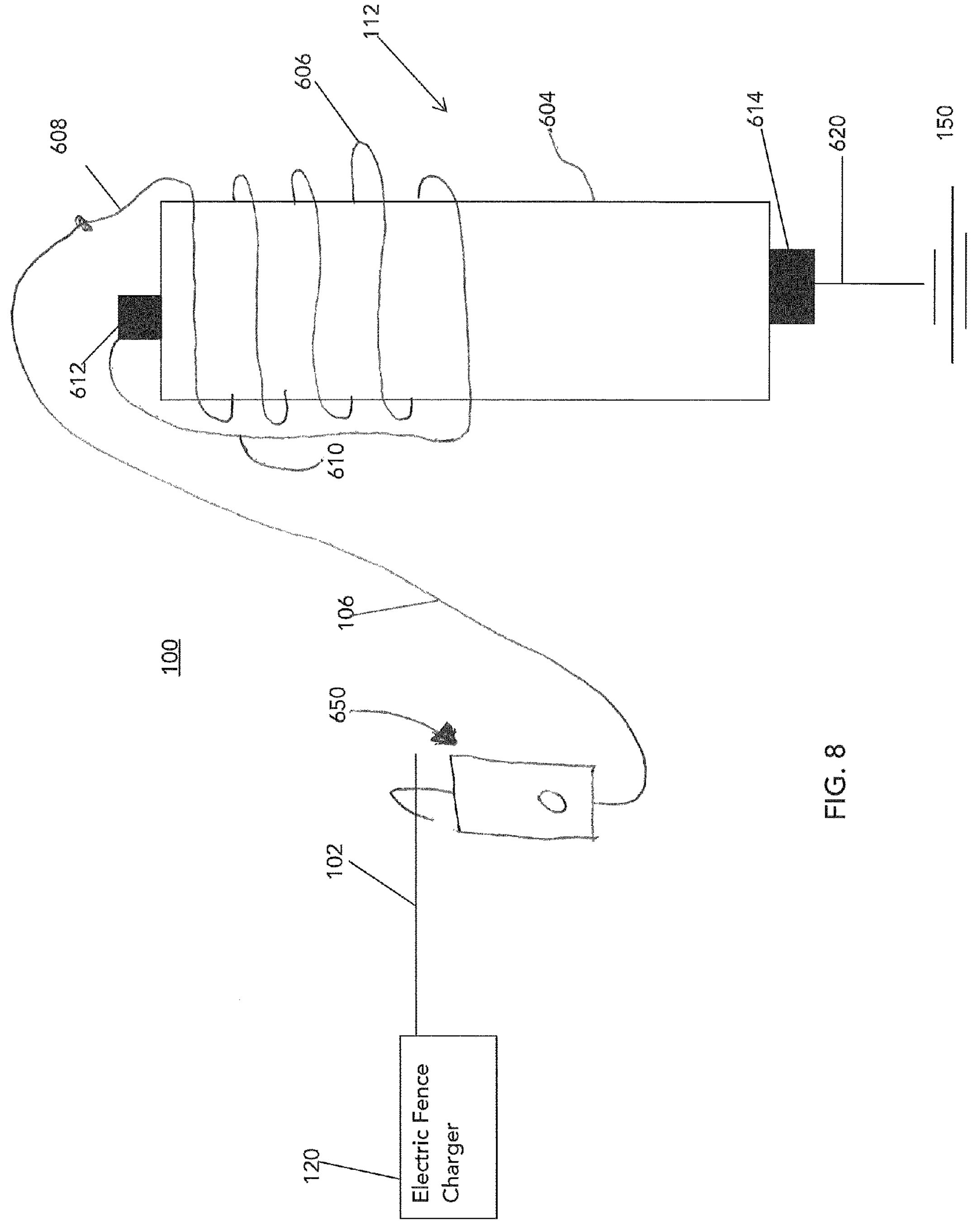
FIG. 8 is a block and partial schematic diagram of an electric fence monitor including a knocker in line with a wire coil and gas discharge lamp.

Referring to FIGS. 6-8, an electric fence monitor 100 is operable to provide a visual indicator of an operating condition of the electric fence 102. The electric fences periodically energized or charged by the electric fence charger 120 (i.e., electric fence box). The electric fence monitor 100 includes a light source 112 configured to provide light in response to receiving power and a wire coil 606. The light source 112 includes a gas discharge lamp including a substantially transparent tube 604, a first electrode 612, and a second electrode 614. The tube 604 is substantially transparent and has a first end and a second end opposite the first end. The first electrode 612 is at the first end of the tube 604. The second electrode 614 is at the second end of the tube 604, and the second electrode 614 is configured to connect to the earth ground 150 via a ground lead 620. The wire coil 606 is wound about the tube 604 of the gas discharge lamp from the first electrode 612 (e.g., the first end of the tube 604) toward the second electrode 614 (e.g., the second end of the tube 604). The wire coil 606 has a first end 608, and a second end 610. The first end 608 of the wire coil 606 is configured to connect to the electric fence 102. The length of electric fence 102 separates the fence charger at 120 from the first end 608 of the wire coil 606. In one embodiment, the electric fence monitor 100 further includes a base 116 operable to support the gas discharge lamp 112 and wire coil 606 and secure to the fence post 160 (e.g., via a mounting bracket). In one embodiment, the electric fence monitor 100 further includes the globe 302 operable to engage the base 116 and enclose the light source 112 (e.g., gas discharge lamp) and prevent precipitation from contacting the light source 112 or wire coil 606.

Referring to FIG. 6, the second end 610 of the wire coil 606 is connected to the first electrode 612 of the gas discharge lamp to receive power from the electric fence 102 such that the electric fence monitor 100 emits a flash of light when the electric fence charger 120 energizes the electric fence 102 and there is not a fault in the length of fence 102 between the electric fence box 120 and the first end 608 of the wire coil 606. In one embodiment, the electric fence monitor 100 further includes the first lead 602 which is configured to connect the first end 608 of the wire coil 606 to the electric fence 102. The first lead 602 provides an all metal connection between the first end 608 of the wire coil 606 and the electric fence 102 when the electric fence monitor 100 is connected to the electric fence 102 and providing the visual indicator of the operating condition of the electric fence 102. In the embodiment of FIG. 6, when no knocker 650 (e.g., air gap) is electrically positioned in series with the light source 112, the tube 604 of the gas discharge lamp is substantially filled with xenon gas. That is, the gas inside the tube 604 is at least 90% xenon and preferably, approximately 100% xenon. Xenon gas has a capacitive type charge carrying capability similar to an air gap such that the power on the electric fence is not drawn down. In one embodiment, current draw from the fence 102 by the electric fence monitor 100 is further adjusted by altering the distance that the wire coil 606 extends along the tube 604 of the gas discharge lamp or by altering the number of turns in the wire coil 606 about the tube 604 of the gas discharge lamp. That is, altering the extension and/or turns of the wire coil 606 alters the ionization of the gases inside the tube 604 changing the impulse response of the overall electric fence monitor 100. Increasing the extension of the wire coil 606 along the tube 604 and increasing the number of turns of the wire coil 606 about the tube 604 both increase the current draw of the electric fence monitor 100. Current draw can thus be manually adjusted (e.g., minimized) after installation of the electric fence monitor 100 on site. Generally, the current draw (e.g., ionization) would be reduced until the gas discharge lamp does not reliably emit a flash of light, and then the current draw (e.g., ionization) would be increased slightly to ensure flashing of the light source in response to the fence charger 120 periodically charging the fence (assuming that there is no fault condition in the length of electric fence 102 between the fence charger 120 and the first lead 602).

The embodiment of FIG. 7 is similar to the embodiment illustrated in FIG. 6 except that the electric fence monitor 100 is further capable of providing an audible indication of the condition of the electric fence 102. This is accomplished by connecting the knocker 650 between the electric fence 102 and the first electrode 612. The second lead 106 of the knocker 650 is connected to the first electrode 612. The first end 608 of the wire coil 606 is connected to the electric fence 102, and the second end 610 of the wire coil 606 is not connected to the first electrode 612. The first electrode 612 is thus connected to the second contact 108 via the second lead 106 and receives power from the second lead 106 such that the electric fence monitor 100 and emits a flash of light when the arc forms in the air gap and transfers power to the gas discharge lamp. Because the electric fence charger 120 provides an impulse to the electric fence 102 and electric fence monitor 100, the transmission line characteristics of the coil of wire 606 ionize the gas inside the tube 604 of the gas discharge lamp without the second end 610 of the wire coil 606 being electrically connected at the same time that the arc forms in the air gap and transfers power to the first electrode 612 from the electric fence 102. In one embodiment, the tube 604 of the gas discharge lamp is substantially filled with xenon gas. That is, the gas inside the tube 604 is at least 90% xenon and preferably, approximately 100% xenon. Xenon gas has a capacitive type charge carrying capability similar to an air gap such that the power on the electric fence is not drawn down. In one embodiment, current draw from the fence 102 by the electric fence monitor 100 is further adjusted by altering the distance that the wire coil 606 extends along the tube 604 of the gas discharge lamp or by altering the number of turns in the wire coil 606 about the tube 604 of the gas discharge lamp. That is, altering the extension and/or turns of the wire coil 606 alters the ionization of the gases inside the tube 604 changing the impulse response of the overall electric fence monitor 100. Increasing the extension of the wire coil 606 along the tube 604 and increasing the number of turns of the wire coil 606 about the tube 604 both increase the current draw of the electric fence monitor 100. Current draw can thus be manually adjusted (e.g., minimized) after installation of the electric fence monitor 100 on site. Generally, the current draw (e.g., ionization) would be reduced until the gas discharge lamp does not reliably emit a flash of light, and then the current draw (e.g., ionization) would be increased slightly to ensure flashing of the light source in response to the fence charger 120 periodically charging the fence (assuming that there is no fault condition in the length of electric fence 102 between the fence charger 120 and the first lead 602).

The embodiment illustrated in FIG. 8 of an electric fence monitor 100 including a gas discharge lamp is similar to that of FIG. 6 except a knocker 650 is connected between the first end 608 of the wire coil 606 and the electric fence 102. The knocker 650 is connected to the electric fence 102, and the first end 608 of the wire coil 606 is connected to the second lead 106 from the knocker 650 to receive power from the second lead 106 such that the electric fence monitor 100 and emits a flash of light in the arc forms in the air gap of the knocker 650 and transfers power to the gas discharge lamp. The second end 610 of the wire coil 606 is connected to the first electrode 612. In one embodiment, the tube 604 of the gas discharge lamp is filled with a mixture including at least 75% xenon and preferably at least 15% argon. In one embodiment, the tube 604 is filled with a mixture of gas including approximately 75% xenon and 25% argon. Argon gas and other noble gases have a slightly different impulse response then xenon gas (i.e., a response more closely resembling a constant resistance that can draw down the static charge on the electric fence 102). Generally, an air gap such as that provided by knocker 650 will be used when xenon makes up less than 90% of the gas in the tube 604 to prevent electricity draw down from the fence 102.

Figure 9:
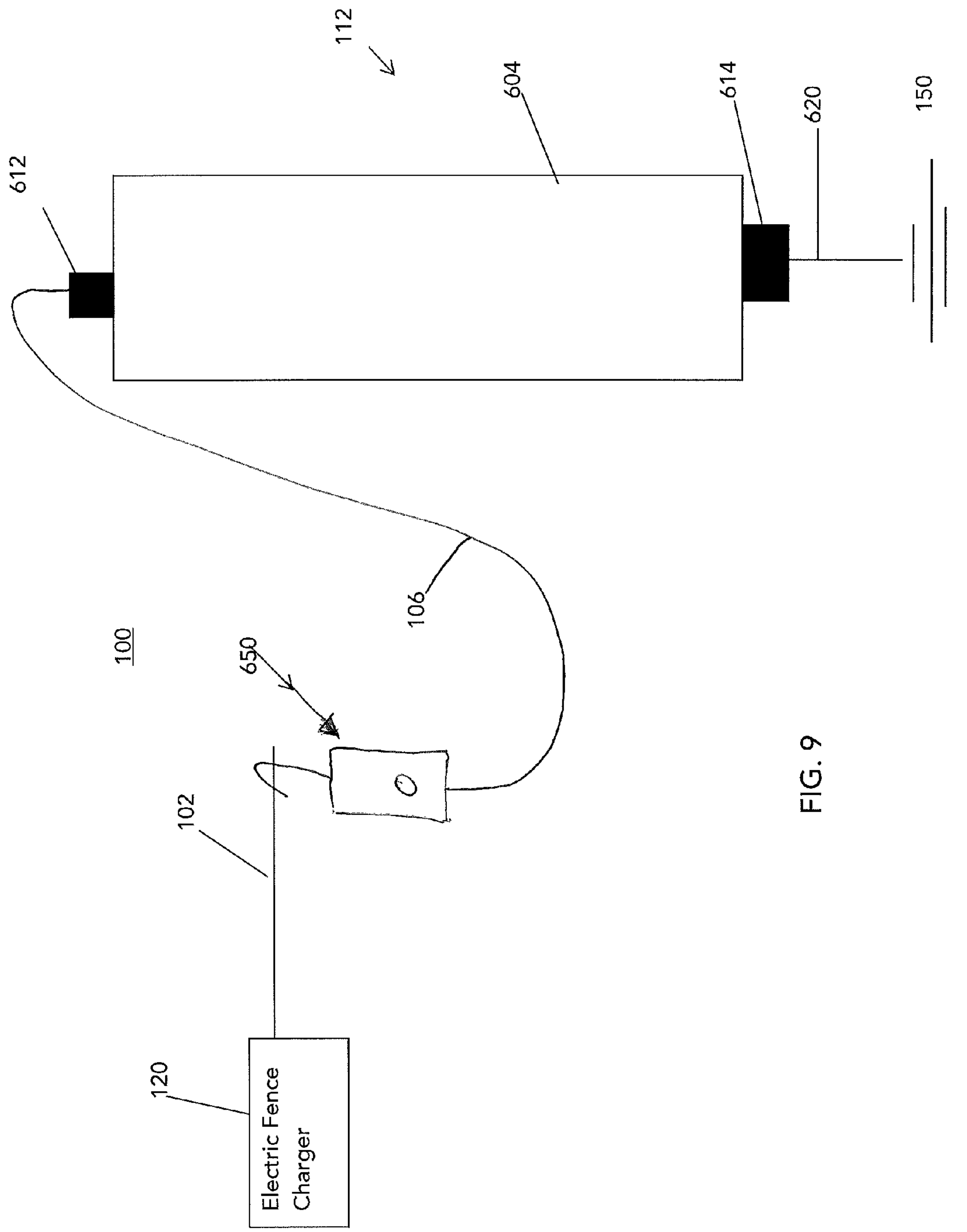
FIG. 9 is a block and partial schematic diagram of an electric fence monitor including a knocker in line with a gas discharge lamp.

Referring to FIG. 9, an electric fence monitor 100 includes a gas discharge lamp having less than 75% xenon therein (e.g., more than 50% argon). In one embodiment, the light source 112 (i.e., gas discharge lamp) has a substantially resistive impulse response due to a lower (e.g., less than 75%) xenon concentration and higher concentration of other noble gases such as argon (e.g., greater than 50% argon). Therefore, the wire coil 606 is not needed ionize xenon gas in the tube 604, and the gas discharge lamp may be connected in series with knocker 650 between the electric fence 102 and the ground 150. The first electrode 612 is configured to connect to the second lead 106 from the knocker 650 to receive power from the second lead 106 such that the electric fence monitor 100 and emits a flash of light from the light source 112 when the arc forms in the air gap and transfers power to the gas discharge lamp. The second electrode 614 is connected to the earth ground 150 via ground lead 620.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful ELECTRIC FENCE MONITOR INCLUDING A GAS DISCHARGE LAMP it is not intended that such references be construed as limitations upon the scope of this invention except as set forth in the following claims.

What is claimed is:

1. An electric fence monitor operable to provide a visual indicator of an operating condition of an electric fence, wherein the electric fence is periodically energized by an electric fence charger, said electric fence monitor comprising:
- a light source configured to provide light in response to receiving power, wherein the light source comprises a gas discharge lamp comprising:
  - a transparent tube having a first end and a second end opposite the first end;
  - a first electrode at the first end of the tube; and
  - a second electrode at the second end of the tube, wherein the second electrode is configured to connect to an earth ground; and
- a wire coil wound about the tube of the gas discharge lamp from the first electrode toward the second electrode, wherein:
  - the wire coil has a first end and a second end;
  - the first end of the wire coil is configured to connect to the electric fence; and
  - a length of the electric fence separates the fence charger from the first end of the wire coil.

2. The electric fence monitor of claim 1, wherein the second end of the wire coil is connected to the first electrode of the gas discharge lamp to receive power from the electric fence such that the electric fence monitor emits a flash of light when the electric fence charger energizes the electric fence and there is not a fault in the length of fence between the electric fence charger and the first end of the wire coil.

3. The electric fence monitor of claim 1, further comprising a first lead configured to connect the first end of the wire coil to the electric fence, wherein the first lead provides an all metal connection between the first end of the wire coil and the electric fence when the electric fence monitor is connected to the electric fence and providing the visual indicator of the operating condition of the electric fence.

4. The electric fence monitor of claim 1, further comprising a first lead configured to connect the first end of the wire coil to the electric fence, wherein:
- the first lead provides an all metal connection between the first end of the wire coil and the electric fence when the electric fence monitor is connected to the electric fence and providing the visual indicator of the operating condition of the electric fence; and
- the tube of the gas discharge lamp is filled with xenon.

5. The electric fence monitor of claim 1, wherein the electric fence monitor is further configured to provide an audible indicator of the operating condition of the electric fence, and the electric fence monitor further comprises:
- a first contact, wherein:
  - the first contact is operable to connect to the electric fence;
  - the electric fence is periodically energized by an electric fence charger;
  - the length of the electric fence separates the fence charger from the first contact;
- a second lead connected to a second contact, wherein:
  - the second contact is separated from the first contact by an air gap;
  - the air gap has a distance less than a critical distance such that an arc forms in the air gap when the electric fence charger energizes the electric fence and there is not a fault on the length of electric fence separating the fence charger from the first contact;
- a housing having a first end and a second end opposite the first end, wherein:
  - the housing is operable to support the first contact and the second contact;
  - the housing is enclosed at the first end, and open at the second end such that the electric fence monitor emits an audible knock when the arc forms in the air gap;
  - the first electrode is configured to connect to the second contact via the second lead and receive power from the second lead such that the electric fence monitor emits a flash of light when the arc forms in the air gap and transfers power to the gas discharge lamp; and
- the second end of the wire coil is not connected to the first electrode.

6. The electric fence monitor of claim 1, wherein the electric fence monitor is further configured to provide an audible indicator of the operating condition of the electric fence, and the electric fence monitor further comprises:
- a first contact, wherein:
  - the first contact is operable to connect to the electric fence;
  - the electric fence is periodically energized by an electric fence charger;
  - the length of the electric fence separates the fence charger from the first contact;
- a second lead connected to a second contact, wherein:

the second contact is separated from the first contact by an air gap;

the air gap has a distance less than a critical distance such that an arc forms in the air gap when the electric fence charger energizes the electric fence and there is not a fault on the length of electric fence separating the fence charger from the first contact;

a housing having a first end and a second end opposite the first end, wherein:

the housing is operable to support the first contact and the second contact;

the housing is enclosed at the first end, and open at the second end such that the electric fence monitor emits an audible knock when the arc forms in the air gap;

the first electrode is configured to connect to the second contact via the second lead and receive power from the second lead such that the electric fence monitor emits a flash of light when the arc forms in the air gap and transfers power to the gas discharge lamp;

the second end of the wire coil is not connected to the first electrode; and the tube of the gas discharge lamp is filled with xenon.

7. The electric fence monitor of claim 1, wherein the electric fence monitor is further configured to provide an audible indicator of the operating condition of the electric fence, and the electric fence monitor further comprises:

a first contact, wherein:

the first contact is operable to connect to the electric fence;

the electric fence is periodically energized by an electric fence charger;

the length of the electric fence separates the fence charger from the first contact;

a second lead connected to a second contact, wherein:

the second contact is separated from the first contact by an air gap;

the air gap has a distance less than a critical distance such that an arc forms in the air gap when the electric fence charger energizes the electric fence and there is not a fault on the length of electric fence separating the fence charger from the first contact;

a housing having a first end and a second end opposite the first end, wherein:

the housing is operable to support the first contact and the second contact;

the housing is enclosed at the first end, and open at the second end such that the electric fence monitor emits an audible knock when the arc forms in the air gap;

the first end of the wire coil is connected to the second lead to receive power from the second lead such that the electric fence monitor emits a flash of light when the arc forms in the air gap and transfers power to the gas discharge lamp; and the second end of the wire coil is connected to the first electrode to provide power from the wire coil to the first electrode of the gas discharge lamp.

8. The electric fence monitor of claim 1, wherein the electric fence monitor is further configured to provide an audible indicator of the operating condition of the electric fence, and the electric fence monitor further comprises:

a first contact, wherein:

the first contact is operable to connect to the electric fence;

the electric fence is periodically energized by an electric fence charger;

the length of the electric fence separates the fence charger from the first contact;

a second lead connected to a second contact, wherein:

the second contact is separated from the first contact by an air gap;

the air gap has a distance less than a critical distance such that an arc forms in the air gap when the electric fence charger energizes the electric fence and there is not a fault on the length of electric fence separating the fence charger from the first contact;

a housing having a first end and a second end opposite the first end, wherein:

the housing is operable to support the first contact and the second contact;

the housing is enclosed at the first end, and open at the second end such that the electric fence monitor emits an audible knock when the arc forms in the air gap;

the first end of the wire coil is connected to the second lead to receive power from the second lead such that the electric fence monitor emits a flash of light when the arc forms in the air gap and transfers power to the gas discharge lamp;

the second end of the wire coil is connected to the first electrode to provide power from the wire coil to the first electrode of the gas discharge lamp; and the tube of the gas discharge lamp is filled with a mixture comprising at least 75% xenon and 15% argon.

9. The electric fence monitor of claim 1, further comprising a base operable to support the gas discharge lamp and wire coil and secure to a fence post.

10. The electric fence monitor of claim 1, further comprising:

a base operable to support the gas discharge lamp and wire coil and secure to a fence post; and a globe operable to engage the base and enclose the light source and wire coil and prevent precipitation from contacting the light source or wire coil.

11. An electric fence monitor operable to provide a visual indicator and an audible indicator of an operating condition of an electric fence, said electric fence monitor comprising:

a first contact, wherein:

the first contact is operable to connect to the electric fence;

the electric fence is periodically energized by an electric fence charger;

a length of the electric fence separates the fence charger from the first contact;

a second lead connected to a second contact, wherein:

the second contact is separated from the first contact by an air gap;

the air gap has a distance less than a critical distance such that an arc forms in the air gap when the electric fence charger energizes the electric fence and there is not a fault on the length of electric fence separating the fence charger from the first contact;

a housing having a first end and a second end opposite the first end, wherein:

the housing is operable to support the first contact and the second contact; and the housing enclosed at the first end, and open at the second end such that the electric fence monitor emits an audible knock when the arc forms in the air gap;

a light source operable to provide light in response to receiving power, wherein the light source comprises a gas discharge lamp comprising:

a transparent tube having a first end and a second end opposite the first end;

a first electrode at the first end of the tube; and a second electrode at the second end of the tube, wherein the second electrode is configured to connect to an earth ground; wherein:

the first electrode is configured to connect to the second lead to receive power from the second lead such that the electric fence monitor emits a flash of light when the arc forms in the air gap and transfers power to the gas discharge lamp.

12. The electric fence monitor of claim 11, further comprising a base operable to support the gas discharge lamp and secure to a fence post.

13. The electric fence monitor of claim 11, further comprising:

a base operable to support the gas discharge lamp and secure to a fence post; and a globe operable to engage the base and enclose the light source to prevent precipitation from contacting the light source.

14. The electric fence monitor of claim 11, wherein the housing comprises a tubular portion having one or more hole through the tubular portion of the housing.

15. The electric fence monitor of claim 11, wherein: the housing comprises:

a tubular portion 2 inches long with ½ inch inside diameter;

an end cap at the first end of the housing, said end cap including a hook configured to hang the housing on the electric fence with the first contact electrically connected to the electric fence and the first end of the housing above the second end of the housing, wherein the end cap is ½ inch long;

a vise configured to maintain the first contact and the second contact at the distance of the air gap; and a retainer screw configured to close the vise on at least one of the first contact and the second contact; and the distance of the air gap is adjustable by unscrewing the end cap from the tubular portion of the housing, loosening the retainer screw, moving the first and second contacts closer or further apart, tightening the retainer screw, and screwing the end cap back onto the tubular portion of the housing.

* * * * *